(12) United States Patent
Bäckman et al.

(10) Patent No.: US 7,737,222 B2
(45) Date of Patent: Jun. 15, 2010

(54) PRESSURELESS POLYMER PIPE

(75) Inventors: Mats Bäckman, Göteborg (SE);
May-Lis Andersson, Stillingsön (SE);
Carl-Gustaf Ek, Västra Frölunda (SE);
Kenneth Lund, Uddevalla (SE);
Markku Vahteri, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 11/547,049

(22) PCT Filed: Mar. 31, 2005

(86) PCT No.: PCT/EP2005/003495

§ 371 (c)(1),
(2), (4) Date: Oct. 2, 2006

(87) PCT Pub. No.: WO2005/095839

PCT Pub. Date: Oct. 13, 2005

(65) Prior Publication Data

US 2007/0207281 A1    Sep. 6, 2007

(30) Foreign Application Priority Data

Apr. 3, 2004  (EP) .................................. 04008180

(51) Int. Cl.
*C08F 210/16* (2006.01)
*C08L 23/08* (2006.01)
*F16L 9/12* (2006.01)

(52) U.S. Cl. ........................... 525/240; 525/53; 526/65; 526/348; 138/121; 138/137

(58) Field of Classification Search .................... 525/53, 525/240; 526/65, 348; 138/121, 137
See application file for complete search history.

(56) References Cited

U.S. PATENT DOCUMENTS

| 3,660,000 | A  | * | 5/1972  | Yoshida et al. ............... 425/327 |
| 4,461,873 | A  | * | 7/1984  | Bailey et al. ................. 525/240 |
| 6,878,454 | B1 | * | 4/2005  | Shannon et al. ............. 428/523 |
| 7,541,084 | B2 | * | 6/2009  | Halahmi et al. .............. 428/174 |
| 2003/0129341 | A1 | * | 7/2003  | Kellum et al. ............... 428/36.9 |
| 2003/0187083 | A1 | * | 10/2003 | Harris ......................... 521/47 |
| 2008/0128042 | A1 | * | 6/2008  | Seyler et al. ................. 138/137 |

FOREIGN PATENT DOCUMENTS

| EP | 0 517 868 B1  |    | 11/1995 |
| EP | 1 146 079 A1  |    | 10/2001 |
| WO | WO 00/01765   |    | 1/2000  |
| WO | WO 00/22040   |    | 4/2000  |
| WO | WO 01/02480   | A1 | 1/2001  |
| WO | WO 03/102075  | A1 | 12/2003 |

OTHER PUBLICATIONS

Scheirs et al., 1996, *TRIP* 4: 408-15, "PE100 Resins for Pipe Applications: Continuing the Development into the 21st Century".

* cited by examiner

*Primary Examiner*—Roberto Rábago
(74) *Attorney, Agent, or Firm*—Merchant & Gould P.C.

(57) ABSTRACT

A pressureless pipe and polymer composition for making such a pipe as well as the use of the polymer composition for pressureless pipes and supplementary parts, are disclosed. The polymer composition is characterized in that the polymer comprises a multimodal ethylene polymer including a copolymer of ethylene and a $C_4$-$C_{10}$ α-olefin comonomer; the ethylene polymer has a total density of 953-958 kg/m$^3$ and a MFR$_5$ of 0.2-2.0 g/10 min; the ethylene polymer has a modulus of elasticity, determined according to ISO 178 of 1300-1700 MPa; the ethylene polymer has a resistance to slow crack growth, determined according to ASTM F 1473 of more than 1.5 hrs.

19 Claims, No Drawings

PRESSURELESS POLYMER PIPE

FIELD OF THE INVENTION

The present invention relates to a pressureless polymer pipe and to a polymer composition for such a pipe.

TECHNICAL BACKGROUND

Pipes of polymer material are frequently used for various purposes, such as fluid transport, i.e. transport of gases or liquids. The fluid may be pressurised such as when transporting natural gas or tap water, or not pressurised such as when transporting sewage (wastewater), drainage (land and road drainage), for storm water applications or for indoor soil and waste. Moreover, the transported fluid may have varying temperature, usually within the temperature range from about 0° C. to about 50° C. Pressureless (not pressurised) pipes may also be used for cable and pipe protection.

Such pressureless pipes are herein also referred to interchangeably as sewage pipes and pressureless sewage pipes.

The term "pipe" as used herein is meant to comprise pipes in a broader sense, as well as supplementary parts like fittings, valves, chambers and all parts which are commonly necessary for e.g. a sewage piping system.

Pipes according to the present invention comprise single or multilayer pipes, where for example one or more of the layers is a metal layer and which may include an adhesive layer. Structural-wall pipes, such as corrugated pipes, double-wall pipes with or without hollow sections, are also comprised by the present invention.

Different requirements are imposed on pipes for the transport of pressurised fluids (so-called pressure pipes) and pipes for the transport of non-pressurised fluids such as sewage (so-called pressureless pipes). While pressure pipes must be able to withstand an internal positive pressure, i.e. a pressure inside the pipe that is higher than the pressure outside the pipe, pressureless pipes do not have to withstand any internal positive pressure, but are instead required to withstand an external positive pressure, i.e. the pressure outside the pipe is higher than the pressure inside the pipe. This higher outside pressure may be due to the earth load on the pipe when submerged in the soil, the groundwater pressure, traffic load, or clamping forces in indoor applications. There is thus a clear distinction between pressure pipes on the one hand and pressureless pipes on the other hand. As mentioned above, the present invention relates to pressureless pipes.

Pressureless pipes such as sewage pipes are made in a variety of dimensions from about 0.1 to about 3 m diameter and of a variety of materials such as ceramics (vitrified clay mainly), concrete, polyvinyl chloride (PVC), and polyethylene (PE). While ceramics and concrete are low-cost materials, they are unfortunately heavy and brittle. There has therefore been a trend during recent years to replace sewage pipes of ceramics or concrete with pipes of polymer materials such as PVC or PE. While PVC costs less than PE per unit weight, PE has advantages over PVC in other respects by having a lower density and thus a lower weight per meter pipe, having superior low temperature properties, and being weldable. Up to now unimodal polyethylene has been used for making sewage pipes of PE.

Sewage pipes of PE must fulfil at least two fundamental criteria. Firstly, they must show sufficient stiffness to withstand the earth load without any help from internal pressure. The stiffness of the pipe is derived primarily from the pipe material and as a measure of the stiffness may be taken the elasticity modulus (or modulus for short) of the pipe material. The higher the modulus of the pipe material, the stiffer the pipe will be. The stiffness of the pipe may be further enhanced by the design of the pipe wall, e.g. by corrugating the pipe. Secondly, the pipe should not be brittle, because if it is too brittle the pipe will fail due to brittle cracking. A measure of the brittleness of the pipe is its resistance to slow crack growth. The higher the resistance to slow crack growth, the better.

When a material with a higher modulus is used a thinner pipe wall may be used while obtaining the same or higher (ring) stiffness as a lower modulus pipe with a thicker pipe wall.

Thinner pipe walls are more sensitive to cracks since any damage or notch on the pipe surface will propagate easier through the pipe wall. Structured-wall pipes (corrugated, ribbed, twin-wall pipes, etc.) are most sensitive to cracks and the slow crack growth properties of the material since the structured pipe design often consists of thin sections.

Structured-wall pipes includes for example single-layer corrugated pipes, ribbed pipes, twin-wall pipes with hollow sections, multilayer pipes with or without hollow sections or foamed layers, and spirally wound pipes with or without hollow sections with smooth or corrugated pipe design.

Basically, pipes with thin sections, either smooth solid-wall pipes of smaller diameters or structured-wall pipes with thin sections are more sensitive to cracks. Due to the high and 3-dimensional structure of structured-wall pipes also the stresses are locally higher when subject to external load conditions compared to smooth solid-wall pipes, i.e. larger sensitivity to cracks.

The stiffness and brittleness are two contradictory properties. Accordingly, the stiffer a pipe is, the more brittle it will normally be. Thus, a high modulus is usually accompanied by a low resistance to slow crack growth. As an illustration, the modulus of the unimodal PE materials hitherto used for pressureless pipes has been limited to about 1100 MPa, because at this level the slow crack growth is only 1.5 hrs, measured according to ASTM F 1473 (2.8 MPa/80° C.).

In view hereof there is a need for an improved pressureless pipe of a polymer material that combines a high stiffness and a low brittleness, i.e. has a high modulus and a high resistance to slow crack growth.

Further, pressureless pipes are often exposed to high as well as low temperatures. They must therefore be durable within a wide range of temperatures which means that they should display a high impact strength, particularly at low temperatures.

In this connection it should be mentioned that through EP 1 192 216 (which corresponds to WO 01/02480) a polyethylene moulding material is known which is used for gas and water pipes. This polyethylene moulding material has a bimodal mass distribution, a total density of at most 0.948 g/cm$^3$, and a melt flow index, MFI$_{190/5}$ of at most 0.2 dg/min. The polyethylene moulding material comprises 35-65% by weight of a low molecular ethylene homopolymer with a viscosity number VZ$_A$ of 40-90 cm$^3$/g, a melt flow index MFI$_{190/2.16}$ of 40-2000 dg/min, and a density of at most 0.965 g/cm$^3$; and 35-65% by weight of a high molecular ethylene copolymer with a viscosity number VZ$_B$ of 500-2000 cm$^3$/g, a melt flow index MFI$_{190/5}$ of 0.02-0.2, and a density of 0.922-0.944 g/cm$^3$. The high molecular ethylene copolymer preferably contains 2.5-4% by weight of a comonomer with 4-10 carbon atoms. Furthermore, the fraction of the polyethylene moulding material recovered in a TREF analysis at 78° C.±3 K has a mean molar mass of at most 200 000 g/mol. It should be pointed out that this reference relates to pressure pipes in contrast to the present invention which relates to pressureless pipes.

Other documents describing the technical background which might be of interest are EP 1 146 079, WO 00/01765, WO 00/22040 and WO 03/102075. However, all these references relate to pressure pipes in contrast to the present invention which relates to pressureless pipes.

SUMMARY OF THE INVENTION

It is an object of the present invention to provide a pressureless pipe that combines a high stiffness and a low brittleness, i.e. has a high modulus and a high resistance to slow crack growth.

It is a further object of the present invention to provide a pressureless pipe that has a high impact strength at low temperatures.

It is another object of the present invention to provide a polymer composition for such a pressureless pipe.

According to the present invention it has been found that these and other objects can be achieved by a specific multimodal ethylene polymer.

The present invention thus provides a pressureless polymer pipe, characterised in that the polymer comprises a multimodal ethylene polymer including a copolymer of ethylene and a $C_4$-$C_{10}$ α-olefin comonomer;

the ethylene polymer has a total density of 953-958 kg/m$^3$ and a MFR$_5$ of 0.2-2.0 g/10 min;

the ethylene polymer has a modulus of elasticity, determined according to ISO 178 of 1300-1700 MPa;

the ethylene polymer has a resistance to slow crack growth, determined according to ASTM F 1473 of more than 1.5 hrs.

The present invention further provides a polymer composition for a pressureless pipe, characterised in that the polymer comprises a multimodal ethylene polymer including a copolymer of ethylene and a $C_4$-$C_{10}$ α-olefin comonomer;

the ethylene polymer has a total density of 953-958 kg/m$^3$ and a MFR$_5$ of 0.2-2.0 g/10 min;

the ethylene polymer has a modulus of elasticity, determined according to ISO 178 of 1300-1700 MPa;

the ethylene polymer has a resistance to slow crack growth, determined according to ASTM F 1473 of more than 1.5 hrs.

The present invention further provides the use of a polymer composition as defined above for pressureless pipes and supplementary pipe parts like fittings, valves and chambers, for drainage and pipe protection.

Further distinctive features and advantages of the present invention will appear from the following description and the appended claims.

DETAILED DESCRIPTION OF THE INVENTION

As mentioned above, the polymer of the pressureless pipe of the present invention comprises a multimodal ethylene polymer. The "modality" of a polymer refers to the form of its molecular weight distribution curve, i.e. the appearance of the graph of the polymer weight fraction as function of its molecular weight. If the polymer is produced in a sequential step process, utilizing reactors coupled in series and using different conditions in each reactor, the different fractions produced in the different reactors will each have their own molecular weight distribution. When the molecular weight distribution curves from these fractions are superimposed into the molecular weight distribution curve for the total resulting polymer product, that curve will show two or more maxima or at least be distinctly broadened in comparison with the curves for the individual fractions. Such a polymer product, produced in two or more serial steps, is called bimodal or multimodal depending on the number of steps. In the following all polymers thus produced in two or more sequential steps are called "multimodal". It is to be noted here that also the chemical compositions of the different fractions may be different. Thus one or more fractions may consist of an ethylene copolymer, while one or more others may consist of ethylene homopolymer.

Preferably, the multimodal ethylene polymer of the present invention is a bimodal polymer comprising a low molecular weight fraction and a high molecular weight fraction.

The multimodal ethylene polymer includes a copolymer of ethylene and a $C_4$-$C_{10}$ α-olefin comonomer. Preferably the comonomer is selected from the group consisting of 1-butene, 1-hexene, 4-methyl-1-pentene, 1-octene, or 1-decene. Most preferably, the comonomer is 1-hexene.

It is preferred that the low molecular weight fraction comprises an ethylene homopolymer and that the high molecular weight fraction comprises an ethylene copolymer as defined above.

The comonomer content of the ethylene polymer should preferably be below 0.4 mol %, more preferably below 0.3 mol %, most preferably below 0.2 mol %, based on the final polymer.

The weight ratio between the low molecular weight polymer fraction and the high molecular weight polymer fraction may vary within wide limits, but preferably lies in the range from 60:40 to 40:60, more preferably from 58:42 to 42:58, and most preferably from 56:44 to 44:56.

As mentioned above, the ethylene polymer has a total density of 953-958 kg/m$^3$, preferably 954-958 kg/m$^3$.

Similarly, the density of the low molecular weight fraction should preferably at least 960 kg/m$^3$, more preferably at least 965 kg/m$^3$, and most preferably at least 970 kg/m$^3$. In addition the density is preferably at most about 980 kg/m$^3$. The density of the high molecular weight fraction should preferably be more than 922 kg/m$^3$, more preferably more than 924 kg/m$^3$, and most preferably more than 927 kg/m$^3$.

The density is determined according to ISO 1183:1987.

The flowability, and hence the processability, of the multimodal ethylene polymer is expressed in terms of its melt flow rate (MFR) which is determined in accordance with ISO 1133:1997. According to ISO 1133 the melt flow rate is determined at 190° C. and at different loadings such as 2.1 kg (MFR$_2$), 5 kg (MFR$_5$), or 21 kg (MFR$_{21}$), conditions D, T and G, respectively. As mentioned earlier, the MFR$_5$ of the multimodal ethylene polymer is 0.2-2.0 g/10 min. Preferably, the MFR$_5$ of the multimodal ethylene polymer is 0.3-1.5 g/10 min, and more preferably 0.4-1.3 g/10 min.

Similarly, the low molecular weight fraction of the multimodal ethylene polymer should preferably have an MFR$_2$ of 20-2000 g/10 min, more preferably 50-1500 g/10 min, and most preferably 100-1200 g/10 min.

The ratio between MFR$_{21}$ and MFR$_5$ is called the flow rate ratio (FRR$_{21/5}$) and is indicative of the molecular weight distribution of the polymer. The multimodal ethylene polymer of the present invention preferably has an FRR$_{21/5}$ value from 20:1 to 50:1, more preferably from 25:1 to 45:1, and most preferably from 25:1 to 40:1, i.e. the polymer has a broad molecular weight distribution.

As stated above, an important property of the pipe and polymer composition of the present invention is its elasticity modulus (or modulus for short). By the elasticity modulus is hear meant the elasticity modulus determined with 3 point bending (the so-called flexural modulus) according to ISO 178 measured at 23° C. and at a speed of 2 mm/min. As stated earlier, the modulus of the multimodal ethylene polymer of the present invention is 1300-1700 MPa, preferably from more than 1400 MPa to 1700 MPa. These values indicate a very high stiffness and as mentioned earlier the modulus of prior art unimodal PE materials has been limited to about 1100 MPa.

As stated above, another decisive property of the pipe and polymer composition of the present invention is the brittleness determined in terms of the resistance to slow crack growth according to ASTM F 1473 (at 2.8 MPa and 80° C. in air). According to the invention the resistance to slow crack growth (time to failure) is more than 1.5 hrs, preferably more than 3 hrs, and more preferably 5 hrs. Preferably the resistance to slow crack growth lies in the range of more than 1.5 hrs and up to 1500 hrs. More preferably, the resistance to slow crack growth lies in the range from more than 1.5 hrs up to 1000 hrs.

As mentioned above, another preferred and important property of the multimodal ethylene polymer is its impact strength, particularly at low temperatures. The impact strength is determined in accordance with ISO 179/1eA. The impact strength at 23° C. should preferably lie in the range 15-30 kJ/m$^2$, more preferably 20-25 kJ/m$^2$. The impact strength at 0° C. should preferably lie in the range 10-20 kJ/m$^2$, more preferably 15-20 kJ/m$^2$. The impact strength at −20° C. should preferably lie in the range 6-15 kJ/m$^2$, more preferably 8-15 kJ/m$^2$.

In addition to the multimodal ethylene polymer the polymer composition according to the present invention may comprise conventional additives. Such additives are e.g. antioxidants, stabilising agents such as heat stabilizers, light stabilisers, UV absorbers, etc. Such additives may be included in amounts of 0-10% by weight, preferably 0-5% by weight. The pipe and polymer composition of the invention does not include any filler, however.

The pressureless polymer pipe according to the present invention may be of any desired design. Preferred pipes of the invention are solid wall pipes having an inner diameter (I.D.) of at most 600 mm, more preferably at most 500 mm, and most preferably at most 400 mm. Further preferred pipes of the invention are structured-wall pipes such as corrugated-wall pipes, of any desired diameter, but preferably of an I.D. below 2 m. Particularly preferred are twin-wall/multilayer-wall pipes with hollow sections having diameters (I.D.) of at most 1000 mm, more preferably at most 800 mm, and most preferably at most 600 mm.

As a particular example of a pressureless polymer pipe according to the invention may be mentioned road culverts. Preferably, such road culverts have a diameter of 0.6 to 3 metres.

As mentioned earlier, the pipe of the invention may be used for various purposes such as for drainage and for cable and pipe protection. The term "drainage" used herein comprises land and road drainage, storm water transport, sewage and waste water transport, and indoor soil and waste (indoor sewage) transport. In addition to the pipe proper the present invention also comprises supplementary pipe parts such as fittings, valves, chambers and the like.

A pressureless pipe made of the multimodal polymer composition of the present invention is prepared in a conventional manner, preferably by extrusion in a conventional pipe extruder. After the extruder the pipe is taken off over a calibrating sleeve and cooled. The pipe can also be manufactured in an extrusion winding process in diameters up to 2 to 3 meters or more. The pipe may also be processed in a corrugation device in combination with or close to the calibration step, e.g. for the manufacture of multilayer pipes of corrugated twin-wall or multilayer-wall design, with or without hollow sections, or multilayer pipes with ribbed design. Pipe parts such as valves, chambers, etc., are prepared by conventional processing such as injection moulding, blow moulding, etc. These techniques are well known to the skilled person and no further particulars should therefore be necessary here concerning this aspect.

It is previously known to produce multimodal, in particular bimodal, olefin polymers, such as multimodal polyethylene, in two or more reactors connected in series. As instance of this prior art, mention may be made of EP 517 868, which is hereby incorporated by way of reference as regards the production of multimodal polymers.

According to the present invention, the main polymerisation stages are preferably carried out as a combination of slurry polymerisation/gas-phase polymerisation. The slurry polymerisation is preferably performed in a so-called loop reactor. It is preferred that the composition is produced in two main polymerisation stages in a combination of loop reactor/gas-phase reactor. Optionally and advantageously, the main polymerisation stages may be preceded by a prepolymerisation, in which case up to 20% by weight, preferably 1-10% by weight, more preferably 1-5% by weight, of the total amount of polymers is produced. The prepolymer is preferably an ethylene homopolymer (HDPE). At the prepolymerisation all of the catalyst is preferably charged into a loop reactor and the prepolymerisation is performed as a slurry polymerisation. Such a prepolymerisation leads to less fine particles being produced in the following reactors and to a more homogeneous product being obtained in the end. Generally, this technique results in a multimodal polymer mixture through polymerisation with the aid of a Ziegler-Natta or metallocene catalyst in several successive polymerisation reactors. In the production of, say, a bimodal polyethylene, which according to the invention is the preferred polymer, a first ethylene polymer is produced in a first reactor under certain conditions with respect to hydrogen-gas pressure, temperature, pressure, and so forth. After the polymerisation in the first reactor, the reaction mixture including the polymer produced is fed to a second reactor, where further polymerisation takes place under other conditions. Usually, a first polymer of high melt flow rate (low molecular weight, LMW) and with no addition of comonomer is produced in the first reactor, whereas a second polymer of low melt flow rate (high molecular weight, HMW) and with addition of comonomer is produced in the second reactor. As comonomer of the HMW fraction various alpha-olefins with 4-10 carbon atoms may be used, but the comonomer is preferably selected from the group consisting of 1-butene, 1-hexene, 4-methyl-1-pentene, 1-octene and 1-decene. The resulting end product consists of an intimate blend of the polymers from the two reactors, the different molecular-weight-distribution curves of these polymers together forming a molecular-weight-distribution curve having a broad maximum or two maxima, i.e. the end product is a bimodal polymer mixture. Since multimodal, and especially bimodal, ethylene polymers, and the production thereof belong to the prior art, no detailed description is called for here, but reference is had to the above mentioned EP 517 868.

As hinted above, it is preferred that the multimodal polyethylene composition according to the invention is a bimodal polymer mixture. It is also preferred that this bimodal polymer mixture has been produced by polymerisation as above under different polymerisation conditions in two or more polymerisation reactors connected in series. Owing to the flexibility with respect to reaction conditions thus obtained, it is most preferred that the polymerisation is carried out in a loop reactor/a gas-phase reactor. Preferably, the polymerisation conditions in the preferred two-stage method are so chosen that a comparatively low-molecular polymer having no content of comonomer is produced in one stage, preferably the first stage, owing to a high content of chain-transfer agent (hydrogen gas), whereas a high-molecular polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 92-98° C., more preferably about 95° C., and the temperature in the gas-phase reactor preferably is 75-90° C., more preferably 80-85° C.

A chain-transfer agent, preferably hydrogen, is added as required to the reactors, and preferably 350-450 moles of $H_2$/kmoles of ethylene are added to the reactor producing the LMW fraction and 20-40 moles of $H_2$/kmoles of ethylene are added to the reactor producing the HMW fraction.

As indicated earlier, the catalyst for polymerising the multimodal polyethylene of the invention preferably is a Ziegler-Natta type catalyst. Particularly preferred are catalysts with a high overall activity as well as a good activity balance over a wide range of hydrogen partial pressures. As an example hereof may be mentioned the catalysts disclosed in EP 688794 and in FI 980788. Such catalysts also have the advantage that the catalyst (pro-catalyst and cocatalyst) only needs to and, indeed, only should be added in the first polymerisation reactor.

Having thus described the present invention it will now be illustrated by way of a non-limiting example of preferred embodiments in order to further facilitate the understanding of the invention.

Example

Three different bimodal ethylene polymer compositions according to the invention were prepared by sequential polymerisation as indicated earlier. The bimodal ethylene polymers were all bimodal polymers with a low molecular weight ethylene homopolymer fraction and a high molecular weight ethylene/1-hexene copolymer fraction. The bimodal polymers are designated Polymer A-C below.

Each of the polymers were extruded into smooth pressureless sewage pipes with an external diameter of 110 mm and a wall thickness of 10 mm. Data for the bimodal polymers and the sewage pipes made thereof were determined as described earlier and are shown in Table 1.

As a comparison a conventional unimodal ethylene-butene copolymer (Comparative 1) was used for making a pressureless sewage pipe of the same dimensions. The test results of Comparative 1 are also shown in Table 1.

From Table 1 it is evident that the present invention provides a pressureless sewage pipe with a unique combination of high rigidity (high modulus) combined with low brittleness (high resistance to slow crack growth). The broad molecular weight distribution as well as the high impact strength at ambient and low temperatures are also apparent from Table 1.

The invention claimed is:

1. A pressureless polymer pipe, wherein the polymer comprises a multimodal ethylene polymer including a copolymer of ethylene and a $C_4$-$C_{10}$ α-olefin comonomer;
   the ethylene polymer has a total density of 953-958 kg/m³ and a $MFR_5$ of 0.2-2.0 g/10 min;
   the ethylene polymer has a modulus of elasticity, determined according to ISO 178 of 1300-1700 MPa;
   the ethylene polymer has a comonomer content of less than 0.4 mol %;
   the ethylene polymer has a resistance to slow crack growth, determined according to ASTM F 1473 of more than 1.5 hrs.

2. A pipe according to claim 1, wherein the polymer is a bimodal ethylene polymer and comprises a low molecular weight ethylene homopolymer fraction and a high molecular weight ethylene copolymer fraction.

3. A pipe according to claim 1, wherein the α-olefin comonomer is selected from 1-butene, 1hexene, 4-methyl-1-pentene, 1-octene, or 1-decene.

4. A pipe according to claim 2, wherein the low molecular weight fraction has a density of at least 960 kg/m³, and the high molecular weight fraction has a density of more than 922 kg/m³.

5. A pipe according to claim 4, wherein the low molecular weight fraction has an $MFR_2$ of 20-2000 g/10 mm.

6. A pipe according to claim 2, wherein the weight ratio between the high molecular weight fraction and the low molecular weight fraction of the ethylene polymer is in the range from 60:40 to 40:60.

7. A pipe according to claim 1, wherein the ethylene polymer has an impact strength, determined according to ISO 179/1eA, at 0° C. of 10-20 kJ/m2.

8. A pipe according to claim 1, wherein the pipe is a solid-wall pipe.

9. A pipe according to claim 1, wherein the pipe is a structured-wall pipe.

10. A pipe according to claim 9, wherein the pipe is a corrugated-wall pipe.

11. A pipe according to claim 1, wherein the pipe is a multilayer pipe.

12. A pipe according to claim 1, wherein the pipe has an inner diameter of below 2 m.

13. A pipe according to claim 1, wherein the pipe has an inner diameter of at most 600 mm.

14. A polymer composition for a pressureless sewage polymer pipe, wherein the polymer comprises a multimodal ethylene polymer including a copolymer of ethylene and a C4-C10 α-olefin comonomer;

TABLE 1

| Polymer | Comonomer amount (mol %) | Density (kg/m³) | $MFR_5$ (g/10 min) | Modulus (MPa) | Slow crack growth (hrs) | Impact strength (kJ/m²) 0° C. | $FRR_{21/5}$ |
|---|---|---|---|---|---|---|---|
| A | 0.17 | 955.0 | 0.22 | 1410 | 8 | 16.8 | 33.7 |
| B | 0.19 | 954.6 | 0.24 | 1430 | 17 | 14.2 | 35.9 |
| C | 0.10 | 957.3 | 0.28 | 1500 | 2 | 13.8 | 39.5 |
| Comp. 1 | 0.18 | 950.0 | 0.53 | 1100 | 1.0 | 6.7 | 32.0 | the ethylene polymer has a density of 953-958 kg/m3 and a MFR5 of 0.2-2.0 g/10 mm;

the ethylene polymer has a modulus of elasticity, determined according to ISO 178 of 1300-1700 MPa;

the ethylene polymer has a comonomer content of less than 0.4 mol %;

the ethylene polymer has a resistance to slow crack growth, determined according to ASTM F 1473 of more than 1.5 hrs.

15. A method for pressureless pipes or supplementary pipe parts, the method comprising forming the polymer composition according to claim 14 as a pressureless pipe or a supplementary pipe part.

16. A method according to claim 15, wherein the method comprises forming supplementary pipe parts.

17. A method according to claim 16, wherein the supplementary pipe parts comprise fittings, valves, or chambers.

18. A method according to claim 15, wherein the pressureless pipe or supplementary pipe part is provided for drainage or for cable or pipe protection.

19. A pipe according to claim 2, wherein the weight ratio between the high molecular weight fraction and the low molecular weight fraction of the ethylene polymer is in the range from 56:44 to 44:56.

* * * * *